United States Patent
Fujita et al.

(10) Patent No.: US 10,722,917 B2
(45) Date of Patent: Jul. 28, 2020

(54) MULTI-LAYER COATING FILM WITH HIGH INFRARED-LIGHT REFLECTIVITY AND HIGH VISIBLE-LIGHT TRANSMISSIVITY AND FORMING METHOD THEREOF

(71) Applicant: NIPPON PAINT HOLDINGS CO., LTD., Osaka (JP)

(72) Inventors: Takeshi Fujita, Osaka (JP); Isamu Onishi, Osaka (JP); Yoichi Adachi, Osaka (JP); Go Suzuki, Osaka (JP); Kazuyuki Kamaya, Osaka (JP)

(73) Assignee: NIPPON PAINT HOLDINGS CO., LTD, Osaka (JP)

( * ) Notice: Subject to any disclaimer, the term of this patent is extended or adjusted under 35 U.S.C. 154(b) by 124 days.

(21) Appl. No.: 16/069,697

(22) PCT Filed: Jan. 12, 2017

(86) PCT No.: PCT/JP2017/000851
§ 371 (c)(1),
(2) Date: Jul. 12, 2018

(87) PCT Pub. No.: WO2017/122734
PCT Pub. Date: Jul. 20, 2017

(65) Prior Publication Data
US 2019/0015867 A1    Jan. 17, 2019

(30) Foreign Application Priority Data

Jan. 13, 2016 (JP) .................................. 2016-004715

(51) Int. Cl.
*G02B 1/10*    (2015.01)
*B05D 1/36*    (2006.01)
(Continued)

(52) U.S. Cl.
CPC ............... *B05D 1/36* (2013.01); *B05D 5/063* (2013.01); *B05D 7/24* (2013.01); *B05D 7/57* (2013.01);
(Continued)

(58) Field of Classification Search
CPC . G02B 1/00; G02B 1/10; G02B 1/105; G02B 1/11; G02B 1/113; G02B 1/115;
(Continued)

(56) References Cited

U.S. PATENT DOCUMENTS 5,571,624 A * 11/1996 Phillips .................. B05D 1/286
428/403
6,013,370 A * 1/2000 Coulter ................. C09C 1/0021
428/403

(Continued)

FOREIGN PATENT DOCUMENTS

CA    2180669 A1    1/1997
EP    0753545 A2    1/1997
(Continued)

OTHER PUBLICATIONS

European Search Report dated Aug. 14, 2019 in EP Application No. 17738488.0.

*Primary Examiner* — Arnel C Lavarias
(74) *Attorney, Agent, or Firm* — Muncy, Geissler, Olds & Lowe, P.C.

(57) ABSTRACT

Provided is a multi-layer coating film including a base film and an infrared-reflective film, wherein the infrared-reflective film includes a scale-like infrared-reflective pigment and a resin; the pigment includes a layered body that has dielectric layers and a metal layer layered in an alternate fashion with the dielectric layer on the outermost layer; the dielectric layer is formed from one or more materials such as titanium dioxide; the metal layer is made from a silver
(Continued)

compound; a film thickness of the metal layer is 5 to 15 nm; a film thickness of the dielectric layer is $((N\lambda)/(4r))\pm20$ nm (N is 1, 2 or 3, wavelength $\lambda$ is 250 to 980 nm, r is the refractive index of the dielectric layer); the infrared reflectance R1 of the base film is smaller than 80% and is smaller than the infrared reflectance R2 of the infrared-reflective film.

6 Claims, 2 Drawing Sheets

(51) Int. Cl.
| | |
|---|---|
| B32B 27/20 | (2006.01) |
| C09D 7/40 | (2018.01) |
| B05D 7/00 | (2006.01) |
| C09C 1/00 | (2006.01) |
| C09D 201/00 | (2006.01) |
| C09C 1/62 | (2006.01) |
| C09D 7/61 | (2018.01) |
| B05D 7/24 | (2006.01) |
| B05D 5/06 | (2006.01) |
| G02B 5/28 | (2006.01) |
| C08K 3/22 | (2006.01) |
| C08K 3/08 | (2006.01) |
| C09D 5/33 | (2006.01) |

(52) U.S. Cl.
CPC ............ *B32B 27/20* (2013.01); *C09C 1/0015* (2013.01); *C09C 1/62* (2013.01); *C09D 7/40* (2018.01); *C09D 7/61* (2018.01); *C09D 201/00* (2013.01); *G02B 5/282* (2013.01); *B05D 5/06* (2013.01); *B32B 2264/102* (2013.01); *B32B 2307/416* (2013.01); *C08K 3/22* (2013.01); *C08K 2003/0806* (2013.01); *C08K 2003/221* (2013.01); *C08K 2003/2231* (2013.01); *C08K 2003/2241* (2013.01); *C08K 2003/2296* (2013.01); *C09C 2200/1054* (2013.01); *C09C 2200/304* (2013.01); *C09C 2210/10* (2013.01); *C09D 5/004* (2013.01)

(58) Field of Classification Search
CPC . G02B 1/116; G02B 1/14; G02B 1/16; G02B 5/20; G02B 5/206; G02B 5/26; G02B 5/28; G02B 5/281; G02B 5/282; G02B 5/285; G02B 5/286; C09D 5/00; C09D 5/004; C09D 5/006; C09D 5/028; C09D 5/29; C09D 5/36
USPC ....... 359/577, 580, 582, 584, 585, 586, 588, 359/589, 590
See application file for complete search history.

(56) References Cited

U.S. PATENT DOCUMENTS

| | | | |
|---|---|---|---|
| 6,383,638 | B1 | 5/2002 | Coulter et al. |
| 6,747,073 | B1* | 6/2004 | Pfaff .................. B41M 3/14 |
| | | | 106/403 |
| 10,131,790 | B2* | 11/2018 | Fujita .................. C09C 3/08 |
| 2003/0215627 | A1 | 11/2003 | Rosenberger et al. |
| 2004/0071957 | A1 | 4/2004 | Fujita |
| 2004/0219344 | A1* | 11/2004 | Andes ................. A61K 8/19 |
| | | | 428/212 |
| 2006/0023327 | A1* | 2/2006 | Coombs ............. G02B 5/0816 |
| | | | 359/883 |
| 2011/0031640 | A1* | 2/2011 | Josephy ................ C09D 7/70 |
| | | | 264/81 |
| 2011/0237683 | A1 | 9/2011 | Schmid et al. |
| 2015/0168619 | A1* | 6/2015 | Ohmoto ........... B32B 17/10651 |
| | | | 359/359 |
| 2016/0141156 | A1* | 5/2016 | Watanabe .............. G02B 5/26 |
| | | | 204/192.27 |

FOREIGN PATENT DOCUMENTS

| | | |
|---|---|---|
| EP | 3168266 A1 | 5/2017 |
| EP | 3404074 A1 | 11/2018 |
| JP | H02-173060 | 7/1990 |
| JP | H05-078544 | 3/1993 |
| JP | H09-508172 A | 8/1997 |
| JP | 2000-212475 | 8/2000 |
| JP | 2001-262016 A | 9/2001 |
| JP | 2002-020647 A | 1/2002 |
| JP | 2002-320912 | 11/2002 |
| JP | 2004-004840 A | 1/2004 |
| JP | 2004-162020 A | 6/2004 |
| JP | 2013-518953 A | 5/2013 |
| JP | 2015-124360 | 7/2015 |
| JP | 2015-202611 | 11/2015 |
| WO | WO1995/029140 A1 | 11/1995 |

\* cited by examiner

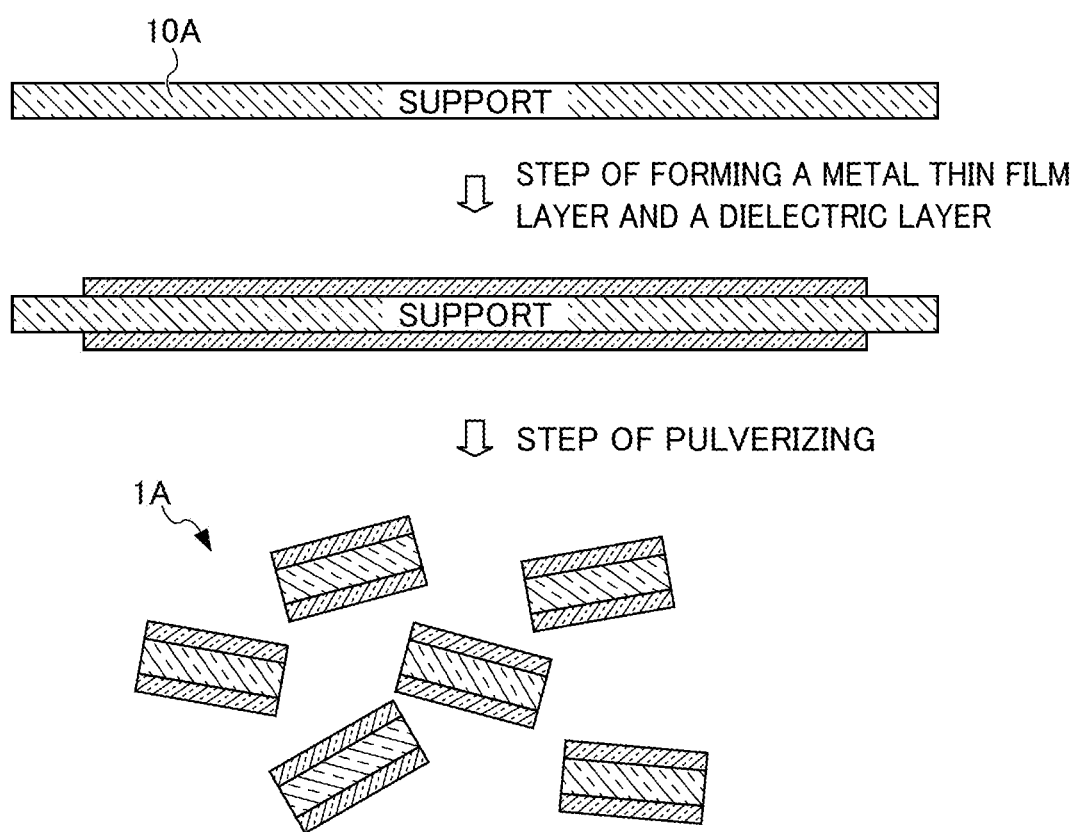

MULTI-LAYER COATING FILM WITH HIGH INFRARED-LIGHT REFLECTIVITY AND HIGH VISIBLE-LIGHT TRANSMISSIVITY AND FORMING METHOD THEREOF

TECHNICAL FIELD

The present invention relates to a multi-layer coating film and a method for forming the multi-layer coating film.

BACKGROUND ART

In recent years, various thermal insulation coating materials have been proposed for forming thermal insulation coating films that reflect infrared light on surfaces of buildings and roads as one of the increasingly demanding energy-saving measures (for example, see Patent Documents 1 and 2). Coloring of these thermal insulation coating materials may be performed by a technique according to the subtractive color mixing method using a pigment with high infrared-light reflectance, such as titanium dioxide.

Meanwhile, a pigment having infrared-reflective capability may, in nature, generally reflect visible light as well. The selection of pigments in coloring may also be very limited. For example, a coloring pigment with less infrared-light absorption needs to be selected. Further, a dark color system such as black in particular may reduce infrared-light reflectance because of its low content ratio of titanium dioxide in a pigment. Therefore, the above technologies currently cannot be used for applications requiring sophisticated designs such as automobile bodies. In order to make it possible to apply to coating films having sophisticated designs, there have been demands for an infrared-reflective pigment having both high infrared-light reflectivity and high visible-light transmissivity.

As the infrared-reflective pigments such as described above, for example, as pigments which can reflect infrared light, but allow visible light to transmit, proposed are those including transparent electrically-conductive inorganic particulates such as ITO (tin-doped indium oxide) and ATO (antimony-doped tin oxide) (For example, see Patent Document 3), those including nano-sized hexaboride particulates as a heat-ray insulation component (for example, see Patent Document 4), optical coherence pigments with multilayered films of oxides (for example, see Patent Document 5). Heat-ray insulation plates also have been proposed in which titanium dioxide, or inorganic particles such as mica coated with titanium dioxide, which have heat-ray reflective capability, are kneaded in a transparent resin (for example, see Patent Documents 6 and 7).

Patent Document 1: Japanese Unexamined Patent Application, Publication No. 2002-20647
Patent Document 2: Japanese Unexamined Patent Application, Publication No. 2002-320912
Patent Document 3: Japanese Unexamined Patent Application, Publication No. 2001-262016
Patent Document 4: Japanese Unexamined Patent Application, Publication No. 2004-162020
Patent Document 5: Japanese Unexamined Patent Application, Publication No. 2004-4840
Patent Document 6: Japanese Unexamined Patent Application, Publication No. H05-78544
Patent Document 7: Japanese Unexamined Patent Application, Publication No. H02-173060

DISCLOSURE OF THE INVENTION

Problems to be Solved by the Invention

However, the pigment of Patent Document 3 suffers from absorption of near-infrared light. The pigment of Patent Document 4 suffers from poor visible-light transmissivity although it has high infrared reflectance. The pigment of Patent Document 5 suffered from a narrow wavelength region of reflectable infrared light. Furthermore, the inorganic particles of Patent Documents 6 and 7 suffer from a problem of low heat-ray reflectance as well as reflection of visible light in the interface between resin and titanium dioxide. Furthermore, a technology that pays attention to a relationship between a base layer formed as a lower layer of an infrared-reflective coating film and the infrared-reflective coating film is not yet developed.

The present invention is made in view of the aforementioned circumstances. An object of the present invention is to provide a multi-layer coating film that includes an infrared-reflective coating film having both high infrared-light reflectivity and high visible-light transmissivity, and having higher infrared-light reflectivity than that of a mono-layered base layer; and a forming method thereof.

Means for Solving the Problems

In order to achieve the above object, the present invention provides a multi-layer coating film including: a base coating film formed on matter to be coated; and an infrared-reflective coating film formed on the base coating film, wherein the infrared-reflective coating film includes a scale-like infrared-reflective pigment and a resin; the infrared-reflective pigment includes a layered body that has dielectric layers and a metal thin film layer layered in an alternate fashion with the dielectric layer on the outermost layer; the dielectric layer is formed from one or more materials selected from the group consisting of titanium dioxide, niobium pentoxide, cerium oxide, tin-doped indium oxide, zinc oxide and tin oxide; the metal thin film layer is made from a silver compound; a film thickness of the metal thin film layer is 5 to 15 nm; a film thickness of the dielectric layer is $((N\lambda)/(4r))\pm 20$ nm (N is 1, 2 or 3) wherein wavelength $\lambda$ of incident light in and around the visible light region is 250 to 980 nm, and r is the refractive index of the dielectric layer; the infrared reflectance R1 of the base coating film is smaller than 80%; and the infrared reflectance R2 of the infrared-reflective coating film is larger than R1.

The layered body preferably has three layers or five layers.

It is preferably further provided with a clear coating film formed on the infrared-reflective coating film.

Furthermore, the present invention provides a method of forming a multi-layer coating film including: a step of coating a base coating composition that forms a base coating film by coating the base coating composition on matter to be coated; and a step of coating an infrared-reflective coating composition that forms an infrared-reflective coating film by coating an infrared-reflective coating composition on the matter to be coated having undergone the step of coating the base coating composition, wherein the infrared-reflective coating composition includes a scale-like infrared-reflective pigment and a resin component; the infrared-reflective pigment includes a layered body that has dielectric layers and a metal thin film layer layered in an alternate fashion with the dielectric layer on the outermost layer; the dielectric layer is formed from one or more materials selected from the group consisting of titanium dioxide, niobium pentoxide, cerium oxide, tin-doped indium oxide, zinc oxide and tin oxide; the metal thin film layer is made from a silver compound; a film thickness of the metal thin film layer is 5 to 15 nm; a film thickness of the dielectric layer is $((N\lambda)/(4r))\pm 20$ nm (N is 1, 2 or 3) wherein wavelength $\lambda$ of incident light in and around the visible light region is 250 to 980 nm, and r is the refractive index of the dielectric layer; in the step of coating the base coating composition, the infrared reflectance R1 of the base coating film formed is adjusted to be smaller than 80%; and the infrared reflectance R2 of the infrared-reflective coating film formed in the step of coating the infrared-reflective coating composition is adjusted to be larger than R1.

The layered body preferably has three layers or five layers.

It is preferable to further provide a step of coating a clear coating composition that forms a clear coating film by coating a clear coating composition on the matter to be coated having undergone the step of coating the infrared-reflective coating composition.

Effects of the Invention

The present invention can provide a multi-layer coating film having an infrared-reflective coating film that has both high infrared-light reflectivity and high visible-light transmissivity and higher infrared-light reflectivity than that of a mono-layered base layer, and a forming method thereof.

BRIEF DESCRIPTION OF THE DRAWINGS

FIG. 3 shows a second method of manufacturing an infrared-reflective pigment according to the present embodiment.

PREFERRED MODE FOR CARRYING OUT THE INVENTION

Figure 1:
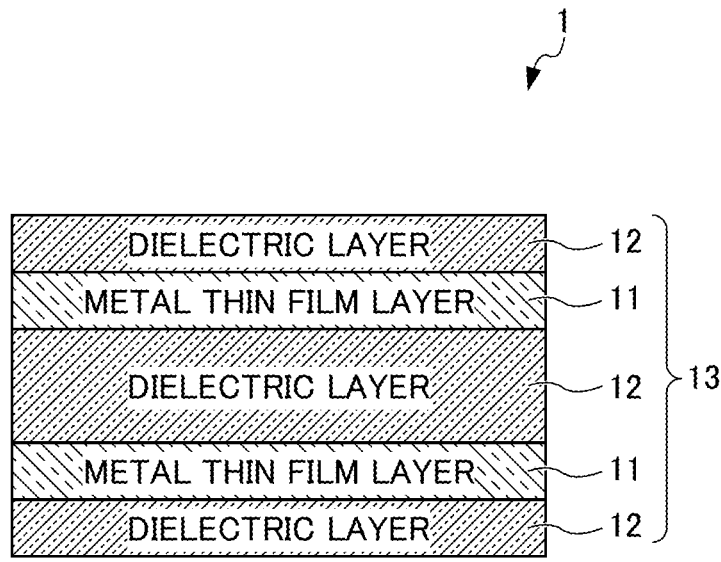
FIG. 1 schematically shows a cross-sectional structure of an infrared-reflective pigment according to one embodiment of the present invention.

Embodiments of the present invention will be described below. Note that the present invention is not limited to the following embodiments.

The multi-layer coating film according to the present embodiment is formed on matter to be coated such as a metal substrate, a plastic substrate, a foam substrate, a wood substrate, or a cement substrate. Examples of the metal include iron, copper, aluminum, tin, zinc or the like and alloys containing these metals. The multi-layer coating film and the method of manufacturing the same according to the present embodiment are preferably applied to applications such as automobiles, building exteriors, construction machines and the like. Among these, in automobile applications, the multi-layer coating film is preferably applied directly on, for example, metallic or plastic materials for automobiles, or on coating films in which a primer coating composition such as a cationic electrodeposition coating composition is coated, and, in some cases, an intermediate coating composition is further coated on the materials.

A multi-layer coating film according to the present embodiment includes: a base coating film that displays color; an infrared-reflective coating film formed on the base coating film; and a clear coating film formed further on the infrared-reflective coating film.

The base coating film has a function of providing mainly aesthetic appearance and design characteristics to the matter to be coated upon which the multi-layer coating film is formed. The base coating film is formed by coating a base coating composition. The base coating composition may be any of a solvent type coating composition and an aqueous coating composition. However, from the viewpoint of low VOC (volatile organic compound) countermeasures, an environmentally-friendly aqueous base coating composition is preferably used.

The base coating composition is preferably an aqueous base coating composition that contains a coloring pigment and/or a brilliant pigment and a film formation resin. As such a base coating composition, for example, aqueous base coating compositions for automobiles and aqueous air dry type top coating compositions for construction may be used.

As the coloring pigment, any of an organic type and an inorganic type may be used. Examples of the organic type coloring pigments include azo chelate pigments, insoluble azo chelate pigments, condensed azo pigments, diketopyrrolopyrrole pigments, benzimidazolone pigments, phthalocyanine pigments, indigo pigments, perinone pigments, perylene pigments, dioxane pigments, quinacridone pigments, isoindolinone pigments, and metal complex pigments. Furthermore, examples of the inorganic coloring pigments include chrome yellow, yellow iron oxide, colcothar, carbon black, and titanium oxide.

Examples of the brilliant pigment include ones that have been conventionally used as coating compositions. Examples thereof include aluminum flake pigments, colored aluminum flake pigments, graphite pigments, mica pigments, metallic titanium flake pigments, stainless flake pigments, plate-like iron oxide pigments, phthalocyanine flake pigments and metal-plated glass flake pigments.

As the film formation resin, for example, as a film formation resin contained in aqueous base coating compositions for automobiles, one formed from a base resin and a curing agent may be used. Specific examples of the base resins include acrylic resins, vinyl resins, polyester resins, alkyd resins, urethane resins or the like containing crosslinking functional groups (for example, hydroxy groups, epoxy groups, carboxy groups, alkoxysilane groups or the like). Examples of the curing agents include melamine resins, urea resins, guanamine resins, block polyisocyanate compounds, and epoxy group-containing compounds. Specific examples of the film formation resins contained in the aqueous top coating air-dry coating composition for construction include acrylic resins, polyester resins, polyurethane resins, alkyd resins, silicone resins, and fluororesins. Furthermore, the film formation resins of the air-dry coating composition for construction may contain, in addition to these, a curing agent such as those described above.

Furthermore, as the coating film formation resin, a solvent type resin may be used. Examples of the solvent type resins include styrene/maleic acid resins, acryl/styrene resins, polystyrene, polyester, polycarbonate, epoxy resins, polyurethane resins, polybutyral resins, polyacrylic acid esters, styrene/butadiene copolymers, styrene/butadiene/acrylic acid copolymers and polyvinyl acetate. A form of the coating film formation resin is not particularly restricted, and aqueous resins, emulsion resins, dispersion resins, solvent soluble type resins, nonaqueous dispersion resins, and powder resins may be used. Furthermore, core-shell type emulsion resins, core-shell type dispersion resins, graft polymers, block copolymers or the like, in which resins having different compositions are complexed, may be used.

The infrared reflectance R1 of the base coating film formed by the base coating composition is less than 80% and R1 is smaller than the infrared reflectance R2 of the infrared-reflective coating film described below. When the infrared reflectance R1 of the base coating film is set as described above, a multi-layer coating film having higher infrared-light reflectivity than that of the case of mono-layered base coating film can be obtained. The base coating film that has the infrared reflectance R1 smaller than 80% and R2 can be obtained by adjusting a type and a blending amount of the coloring pigment used in the base coating composition. Specifically, the infrared reflectance R2 of an infrared-reflective film described below is measured in advance, and the type and the blending amount of the coloring pigment are adjusted such that the infrared reflectance R1 is smaller than R2 and is smaller than 80%.

Note that the infrared reflectance in the present specification indicates a numerical value measured according to a method in accordance with JIS-K5602:2008 "Determination of reflectance of solar radiation by paint film" and shows the reflectance to infrared light in a wavelength region of 780 to 2500 nm.

The infrared-reflective coating film is formed on a base coating film. The infrared-reflective coating film is a coating film that contains a scale-like infrared-reflective pigment and a resin and has both high infrared-light reflectivity and high visible-light transmissivity. Accordingly, the infrared-reflective coating film provides high infrared-light reflectivity to the multi-layer coating film without damaging the aesthetic appearance and design properties of the base coating film. The infrared-reflective coating film is formed by coating an infrared-reflective coating composition containing a scale-like infrared-reflective pigment, a resin component, and a solvent as main components. Examples of the type of the infrared-reflective coating composition include organic solvent type coating compositions, NAD (nonaqueous dispersion) type coating compositions, aqueous coating compositions, emulsion coating compositions, and colloidal coating compositions. The infrared-reflective coating composition according to the present embodiment may be formed according to conventional well-known methods.

The infrared-reflective pigment is a scale-like (plate-shaped) pigment that has both high infrared-light reflectivity and high visible-light transmissivity. The infrared-reflective pigment according to the present embodiment is includes a layered body that includes dielectric layers and a metal thin film layer layered in an alternate fashion with the dielectric layer on the outermost layer.

In what follows, an infrared-reflective pigment according to one embodiment of the present invention will be described in detail with reference to the drawings.

FIG. 1 schematically shows a cross-sectional structure of an infrared-reflective pigment according to the present embodiment. As shown in FIG. 1, an infrared-reflective pigment 1 as one example of an infrared-reflective pigment according to the present embodiment includes a layered body 13 having total five layers of two metal thin film layers 11 and three transparent dielectric layers 12, which are layered in an alternate fashion with the dielectric layer 12 on the outermost layer. Note that the layered body 13 of the infrared-reflective pigment 1 according to the present embodiment is not limited to the five-layered structure as shown in FIG. 1. It will suffice as long as the metal thin layer 11 and the dielectric layers 12 are layered in an alternate fashion and the dielectric layer 12 is arranged on the outermost layer. The number of the layers is not limited, but a layered body having three layers or five layers is preferable. In such a case, when the metal thin film layer 11 or the dielectric layer 12 each is formed from different materials into continuous layers, the metal thin film layer 11 or the dielectric layer 12 each is counted as one layer.

In what follows, the structure of each layer of the metal thin film layer 11 and the dielectric layer 12 will be described in detail.

The metal thin film layer 11 has a function to reflect infrared light. The infrared-reflective pigment 1 according to the present embodiment is configured to include the layered body 13 having the metal thin film layer 11, and thus can show high infrared-light reflectivity.

The metal thin film layer 11 is formed from a silver compound. The silver compound in the present specification indicates a compound that contains silver as a main component, that is, a compound that contains 50% silver by mass or more. As the silver compound, for example, silver, Au—Ag alloys, Ag—In alloys, Ag—Sn alloys, Ag—Bi alloys, and Ag—Ga alloys can be used. When the metal thin film layer 11 is formed from the silver compound, an infrared-reflective pigment 1 having high infrared-light reflectivity can be obtained. The metal thin film layer 11 may be formed from a single silver compound or may be formed from a plurality of silver compounds. Note that when a plurality of layers of the metal thin film layers 11 are provided, each of the metal thin film layers 11 is preferably formed from the same kind of silver compound in view of manufacture. However, the metal thin film layers 11 may be each formed from different kinds of silver compounds.

The metal thin film layer 11 has a film thickness of 5 to 15 nm. When the film thickness of the metal thin film layer 11 is thinner than 5 nm, sufficient infrared-light reflectivity of the infrared-reflective coating film may not be obtained, and when the film thickness of the metal thin film layer 11 exceeds 15 nm, sufficient visible-light transmissivity may not be obtained. It is more preferable that the metal thin film layer 11 has a film thickness of 6 to 14 nm.

The dielectric layer 12 is transparent and functions as an antireflective layer of the metal thin film layer 11 in the visible light region. That is, the dielectric layer 12 has a function to improve the transmittance of an incident light in the visible light region. The infrared-reflective pigment 1 according to the present embodiment shows high visible-light transmissivity when configured by containing the layered body 13 having the dielectric layer 12.

The dielectric layer 12 is formed from one or more materials selected from the group consisting of titanium dioxide, niobium pentoxide, cerium oxide, tin-doped indium oxide, zinc oxide and tin oxide. Among these, titanium dioxide and tin-doped indium oxide (ITO) are preferably used. Note that from the viewpoint of production, each of the dielectric layers 12 is preferably formed from one material selected from the group consisting of titanium dioxide, niobium pentoxide, cerium oxide, tin-doped indium oxide, zinc oxide and tin oxide. However, each of the dielectric layers 12 may be formed from a mixture of different materials. Furthermore, the kind of the material that constitutes each of the dielectric layers 12 may be the same, or may be different from each other.

A film thickness of the dielectric layer 12 is $((N\lambda)/(4r))\pm 20$ nm, when a wavelength $\lambda$ of incident light in and around the visible light region is 250 to 980 nm, and the refractive index of the dielectric layer 12 is r. Note that in the above equation, N is 1, 2 or 3. Furthermore, the visible light region in the present specification shows a region of a wavelength λ of 380 to 780 nm. When the film thickness of the dielectric layer 12 is set as shown above, the visible-light transmittance of the dielectric layer 12 becomes excellent. Furthermore, the transmissivity of the visible light can be enhanced by making use of an optical interference effect. Note that a wavelength λ of the incident light is preferably 250 to 780 nm, and more preferably 250 to 550 nm.

In the infrared-reflective pigment 1, a surface-treatment layer having an effect of suppressing deterioration in the infrared-reflective coating film may be coated on an entirety or a part of a surface of the layered body 13. Furthermore, a surface-tension adjustment layer that serves to promote migration of the infrared-reflective pigment 1 to a surface of a coating film may be coated on an entirety or a part of the surface of the surface-treatment layer, or the surface-tension adjustment layer may be contained in the surface-treatment layer.

Next, methods of manufacturing the infrared-reflective pigment 1 according to the present embodiment will be described.

[First Method of Manufacture]

Figure 2:
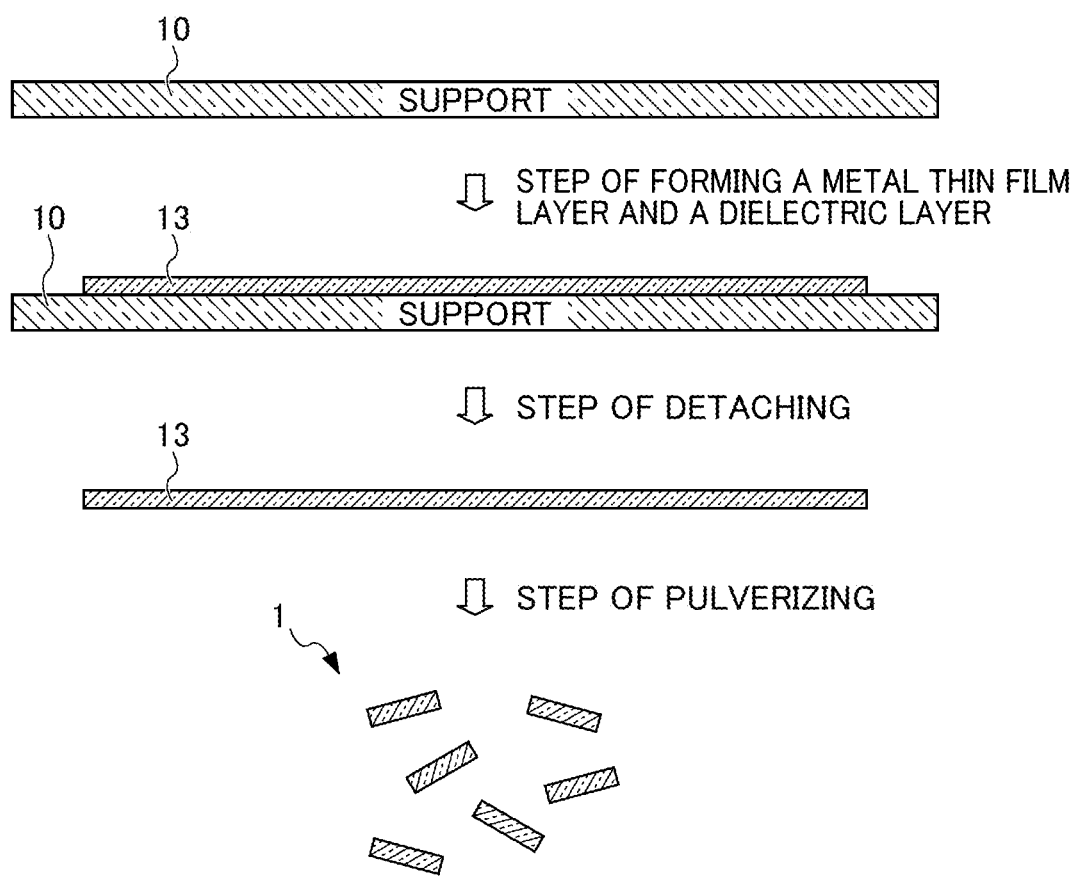
FIG. 2 shows a first method of manufacturing an infrared-reflective pigment according to the present embodiment.

FIG. 2 shows a first method of manufacturing the infrared-reflective pigment 1 according to the present embodiment. As shown in FIG. 2, the first method of manufacturing the infrared-reflective pigment 1 includes the steps of: forming the layered body 13 including the metal thin film layers 11 and the dielectric layers 12 on a support 10 (hereinafter, referred to as the step of forming a metal thin film layer and a dielectric layer); detaching the layered body 13 from the support 10 (hereinafter, referred to as the step of detaching); and pulverizing the layered body 13 (hereinafter, referred to as the step of pulverizing).

First, in the step of forming a metal thin film layer and a dielectric layer, a metal thin film layer and a dielectric layer are layered on one surface (the upper surface in FIG. 2) of the support 10 in an alternate fashion to obtain the layered body 13. The support 10 can be transparent or opaque, and can be formed from a metal material, a polymer material, an oxide material, glass, or the like.

As the metal material, metal materials generally used for a support or the like can be used. Specific examples include various stainless steels (SUS) such as SUS 304, SUS 316, SUS 316L, SUS 420J2, and SUS 630; gold; platinum; silver; copper; nickel; cobalt; titanium; iron; aluminum; tin; or various alloys such as nickel-titanium (Ni—Ti) alloys, nickel-cobalt (Ni—Co) alloys, cobalt-chromium (Co—Cr) alloys, and zinc-tungsten (Zn—W) alloys; inorganic materials such as various ceramic materials; and even metal-ceramics complexes; and the like. These may be used alone independently or may be used in combination of two or more.

As the polymer material, various resin films can be used. Specific examples thereof include polyolefin films (polyethylene, polypropylene, and the like), polyester films (polyethylene terephthalate, polyethylene naphthalate, and the like), polyvinyl chloride films, and cellulose triacetate films, and preferable examples include polyester films. Polyester films (hereinafter, polyesters) are preferably formed of a polyester having film formability and containing a dicarboxylic acid component and a diol component as the main constitutional components.

Among the aforementioned polyesters, terephthalic acid and 2,6-naphthalene dicarboxylic acid are preferred for the dicarboxylic acid component, and a polyester having a main constitutional component of ethylene glycol or 1,4-cyclohexane dimethanol as the diol component is preferred in view of transparency, mechanical strength, dimensional stability, and the like. Among these, preferred are a polyester having polyethylene terephthalate or polyethylene naphthalate as the main constitutional component; a copolymeric polyester composed of terephthalic acid, 2,6-naphthalene dicarboxylic acid, and ethylene glycol; and a polyester having a mixture of two or more of these polyesters as the main constitutional component.

As the oxide material, titanium dioxide, aluminum oxide, zirconium oxide, mica and the like are used.

A thickness of the support 10 is preferably 0.05 to 10 mm, and more preferably 0.1 to 5 mm. The support 10 may include two or more layered supports, and in this case, the types of each layered support in the support 10 may be the same, or may be different.

Note that a release layer formed with an acrylic ester copolymer resin as a raw material is preferably provided on a surface of the support 10. The release layer may be formed by a known method, and for example, it may be applied by a bar coater method, a dipping method, a spin coater method, a spray method or the like. When the release layer is provided on a surface of the support 10, the layered body 13 having the metal thin film layers 11 and the dielectric layers 12 can be easily detached from the support 10 in the detachment step described below.

The metal thin film layer 11 and the dielectric layer 12 are each formed on the support 10 by a chemical vapor deposition method (CVD), a sputtering method, a solution coating method, an electron beam evaporation method (EB), an ion plating method, a dipping method, a spray method or the like. Among these, the chemical vapor deposition method (CVD), the electron beam evaporation method (EB), the sputtering method, and the solution coating method are preferably used.

The chemical vapor deposition method (CVD), the electron beam evaporation method (EB) and the sputtering method can form the layered body 13 having the metal thin film layer 11 and the dielectric layer 12 under publicly known conditions.

According to the solution coating method, a metal-containing solution including a component material of the metal thin film layer 11, and a dielectric substance-containing solution including a component material of the dielectric layer 12 are prepared, and these are then applied in an alternate fashion and dried to form a layered body 13 having the metal thin film layer 11 and the dielectric layers 12. Examples of the coating methods include a roll coating method, a rod bar coating method, an air knife coating method, a spray coating method, a slide-type curtain coating method, a slide hopper (slide bead) coating method, an extrusion coating method and the like. Coating amounts of the metal thin film solution and the dielectric substance solution are appropriately selected so that a film thickness after drying is within the preferred range of film thickness of each of the metal thin film layer 11 and dielectric layer 12.

Subsequently, in the step of detaching, the layered body 13 having the metal thin film layers 11 and the dielectric layers 12 is detached from the support 10. For example, the layered body 13 can be detached from the support 10 by immersing it in a solvent as will be described below. As was described above, the layered body 13 formed on the support 10 can be easily detached by providing a release layer on a surface of the support 10.

Subsequently, in the step of pulverizing, the layered body 13 having the metal thin film layers 11 and the dielectric layers 12 which have been detached from the support 10 is pulverized into a desired size. As the pulverization method, for example, mechanical pulverization with a pulverizer, wet or dry pulverizations with a vibration mill, a ball mill, a jet mill, an ultrasonic cleaning machine, an ultrasonic disperser or the like may be used. When wet pulverization is used, any solvent may be used as long as a constitutional component of the layered body 13 does not dissolve therein. Examples of the solvent include: water; alcohols such as methanol, ethanol, isopropanol, n-butyl alcohol, t-butyl alcohol and ethylene glycol; ketones such as acetone, and methyl ethyl ketone; esters such as ethyl acetate; halides such as chloroform and methylene chloride; hydrocarbons such as butane and hexane; ethers such as tetrahydrofuran (THF), butyl ether, and dioxane; aromatics such as benzene, xylene, and toluene; amides such as N,N-dimethylformamide (DMF) and dimethylacetamide (DMAc); and solvent mixtures thereof. When dry pulverization is performed, the layered body 13 may be cooled with liquid nitrogen and the like to bring it to a hardened state, and then pulverized.

After the step of pulverizing, classification is preferably performed to obtain a desired particle diameter. For the method of classification, a conventionally known dry classifier or the like can be used. For example, used are a classifier with a mesh screen; a gravitational classifier of a horizontal flow-type, an upward flow-type, or the like in which coarse particles and fine powders are classified by taking advantage of the differences in the settling rates and the upward flow rates; a centrifugal classifier in which sedimentation of particles in a centrifugal field is used; an inertial classifier in which particles with large inertia are diverted from the flow line for classification by quickly changing the direction of a particle-carrying air flow.

In the infrared-reflective pigment 1 according to the present embodiment after the steps of pulverization and classifying, a proportion of the infrared-reflective pigment 1 having a particle diameter of 1 μm or smaller is preferably 10% by volume or smaller. By making the proportion of the infrared-reflective pigment 1 having the particle diameter of 1 μm or smaller to be 10% by volume or smaller, white blurring or turbidity of the infrared-reflective coating film formed is prevented from occurring. Therefore, even when the multi-layer coating film is formed without providing a clear coating film to be described below, its appearance can be improved. In order to make the proportion of the infrared-reflective pigment 1 having a particle diameter of 1 μm or smaller to be 10% by volume or smaller, energy imparted in the pulverization step, specifically, when the mechanical pulverization is performed, a machine output or a pulverization time may be adjusted. Note that the pulverization method for making the particle diameter of the infrared-reflective pigment 1 to be the above value is not particularly limited, and any of the above pulverization methods can be used. The particle diameter and the volume % of the infrared-reflective pigment can be measured according to the methods described below. (Measurement device) Laser Diffraction Particle Size Analyzer LS 13 320 (manufactured by Beckmann/Coulter Inc.) (Measurement method) Wet method (solvent; IPA, Pump speed; 54%)

The infrared-reflective pigment 1 obtained may be subjected, after the step of pulverizing, to a step of forming a surface-treatment layer, and furthermore to a step of forming a surface-tension adjustment layer.

[Second Method of Manufacture]

FIG. 3 shows a second method of manufacturing the infrared-reflective pigment 1 according to the present embodiment. As shown in FIG. 3, the second method of manufacturing the infrared-reflective pigment 1 includes the steps of: forming a metal thin film layer and a dielectric layer on a support 10A to obtain a layered body 13 (hereinafter, referred to as the step of forming a metal thin film layer and a dielectric layer); and pulverizing the layered body 13 including the support 10A (hereinafter, referred to as the step of pulverizing). The second method of manufacture differs from the first method of manufacture in that the step of detaching is not included, and the support 10A constitutes a part of the infrared-reflective pigment 1.

As the support 10A, transparent materials may be used among those recited with regard to the first method of manufacture. Specifically, transparent materials made of titanium dioxide, aluminum oxide, zirconium oxide, mica, glass or the like may be used. Note that a release layer is not required on a surface of the support 10A because the step of detaching is not included.

The thickness of the support 10A is preferably 0.05 to 100 μm, and more preferably 0.1 to 50 μm from the viewpoint that the support 10A can serve as a substrate for formation of a thin film in the step of forming a metal thin film layer and a dielectric layer, and can be easily pulverized in the step of pulverizing.

Here, a dielectric thin plate functioning as the dielectric layer 12 may be used as the support 10A. Specifically, titanium dioxide, niobium pentoxide, cerium oxide, tin-doped indium oxide, zinc oxide, and tin oxide which can constitute the dielectric layer 12 can be used as the dielectric layer thin plate. The thickness of the dielectric thin plate is to meet the aforementioned requirement for the thickness of the support 10A, and to be sufficient for functioning as the dielectric layer 12. Specifically, the film thickness of the dielectric thin plate is $((N\lambda)/(4r))\pm 20$ nm (N is 1, 2 or 3) when a wavelength $\lambda$ of an incident light in and around the visible light region is 250 to 980 nm, and the refractive index of the dielectric layer 12 is r.

In the present embodiment, the metal thin film layer 11 and the dielectric layer 12 are formed on the both sides of the support 10A in the step of forming a metal thin film layer and a dielectric layer. The method of forming the metal thin film layer 11 and the dielectric layer 12 itself is similar to that in the first method of manufacture. For example, the dielectric layer 12 is formed after the metal thin film layer 11 is formed on the both sides of the support 10A. This provides a layered body 13 in which the dielectric layer 12 of the third layer at the middle of the five-layer structure is replaced by the support 10A in the layered body 13 shown in FIG. 1. Note that the metal thin film layers and the dielectric layers are formed on the both sides of the support 10A in the present embodiment, but they may be formed on only one side.

Subsequently, the resulting layered body 13 can be pulverized to obtain the infrared-reflective pigment 1A. The infrared-reflective pigment 1A may be subjected to the step of forming a surface-treatment layer after the pulverization step, and furthermore may be subjected to the step of forming a surface-tension adjustment layer. The step of pulverizing, the step of forming a surface-treatment layer, and the step of forming a surface-tension adjustment layer are similar to those in the first method of manufacture.

As the infrared-reflective pigment 1, those described above may be used. A content of the infrared-reflective pigment 1 in the infrared-reflective coating composition according to the present embodiment is preferably a content by which a surface density of the pigment is 60 to 300%. The surface density of the pigment (5) is a mass ratio of the content of the infrared-reflective pigment actually contained relative to the content required to cover the entire coating surface in just the right amount such that the infrared-reflective pigment is aligned on one surface without mutually overlapping. Specifically, the surface density of the pigment may be calculated by the following formula.

Surface density of pigment $(\%) = WCA(\text{cm}^2/\text{g}) \times \text{PWC}$ $(\%) \times$ specific gravity of coating film $(\text{g/cm}^3) \times$ film thickness (cm)

Here, WCA represents a water surface diffusion area per gram, and is calculated in accordance with a method based on JIS-K 5906:19.98. Note that PWC may be calculated by the following formula.

PWC (%)=pigment/(solid content of resin non-volatile component (of additives and the like) pigment)

Examples of the resin components include (a) acrylic resins, (b) polyester resins, (c) alkyd resins, (d) fluororesins, (e) epoxy resins, (f) polyurethane resins, and (g) polyether resins. They can be used alone or in combination of two or more. In particular, acrylic resins, polyester resins and alkyd resins are preferably used in view of weather resistance and economic efficiency.

Examples of the (a) acrylic resin include copolymers of an acrylic monomer and another ethylenically unsaturated monomer. Examples of the acrylic monomers which can be used for the copolymer include: esterified substances of acrylic acid or methacrylic acid with methyl, ethyl, propyl, n-butyl, i-butyl, t-butyl, 2-ethylhexyl, lauryl, phenyl, benzyl, 2-hydroxyethyl, 2-hydroxypropyl, and the like; ring-opening addition products of caprolactone with acrylic acid or 2-hydroxyethyl methacrylate; glycidyl acrylate acid or glycidyl methacrylate, acrylamide, methacrylamide and N-methylolacrylamide, (meth)acrylic acid ester of polyhydric alcohol; and the like. Examples of ethylenically unsaturated monomers include styrene, α-methyl styrene, itaconic acid, maleic acid, vinyl acetate, and the like.

Examples of the (b) polyester resin include saturated polyester resins and unsaturated polyester resins, and specifically, condensates obtained by heating and condensing, for example, polybasic acid and polyhydric alcohol. Examples of the polybasic acid include saturated polybasic acids and unsaturated polybasic acids. Examples of the saturated polybasic acid include phthalic anhydride, terephthalic acid, succinic acid, and the like. Examples of the unsaturated polybasic acid include maleic acid, maleic anhydride, fumaric acid, and the like. Examples of the polyhydric alcohol include dihydric alcohols, trihydric alcohols and the like. Examples of the dihydric alcohol include ethylene glycol, diethylene glycol and the like. Examples of the trihydric alcohol include glycerin, trimethylolpropane, and the like.

Examples of the (c) alkyd resin include alkyd resins obtained by reacting the above polybasic acid, polyhydric alcohol and property modification material such as fats and fatty acids (soybean oil, linseed oil, coconut oil, stearic acid, and the like), and natural resin (rosin, amber, and the like).

Examples of the (d) fluororesin include either of vinylidene fluoride resin and tetrafluoroethylene resin or a mixture thereof, resins including various fluorine based copolymers which can be obtained by copolymerizing fluoroolefin and polymerizable compounds containing a hydroxy group and other polymerizable vinyl based compounds.

Examples of the (e) epoxy resin include resins which are obtained by reacting bisphenol with epichlorohydrin, and the like. Examples of the bisphenol include bisphenols A, F and the like. Examples of the bisphenol type epoxy resins include Epicoat 828, Epicoat 1001, Epicoat 1004, Epicoat 1007, Epicoat 1009 and the like.

Examples of the (f) polyurethane resin include resins having urethane bonds which can be obtained from various polyol components such as acrylic, polyester, polyether, and polycarbonate, and polyisocyanate compounds. Examples of the above polyisocyanate compounds include 2,4-tolylene diisocyanate (2,4-TDI), 2,6-tolylene diisocyanate (2,6-TDI), and a mixture thereof (TDI), diphenylmethane-4,4'-diisocyanate (4,4'-MDI), diphenylmethane-2,4'-diisocyanate (2,4'-MDI), and a mixture thereof (MDI), naphthalene-1,5-diisocyanate (NDI), 3,3'-dimethyl-4,4'-biphenylene diisocyanate, xylylene diisocyanate (XDI), dicyclohexylmethane.diisocyanate (hydrogenated HDI), isophorone diisocyanate (IPDI), hexamethylene diisocyanate (HDI), hydrogenated xylylene diisocyanate (HXDI), and the like.

Examples of the (g) polyether resin include a polymer or copolymer with ether bonds and have at least two hydroxy groups per molecule of polyethers or the like derived from a polyoxyethylene based polyether, a polyoxypropylene based polyether, or a polyoxybutylene based polyether, or an aromatic polyhydroxy compound such as bisphenol A or bisphenol F. Furthermore, examples include carboxy-group-containing polyether resins which are obtained by reacting the above polyether resin with a multivalent carboxylic acid such as succinic acid, adipic acid, sebacic acid, phthalic acid, isophthalic acid, terephthalic acid, or trimellitic acid and the like or with a reactive derivative such as acid anhydrides thereof.

The resin components described above are available in both the curing type and the lacquer type, any of which may be used. The curing type may be used in a mixture with a cross-linking agent such as an amino resin, a (block) polyisocyanate compound, an amine type, a polyamide type, or multivalent carboxylic acid, and a curing reaction can be promote by heating or at ordinary temperature.

Furthermore, a resin component that is cured by UV rays may be used to cause a curing reaction by curing with UV rays. Examples of such a resin component include resin components constituted of a reactive monomer (that is, a UV monomer) or a reactive oligomer (that is, a UV oligomer). These monomers or oligomers are used as a mixture with a photopolymerization initiator and become resinous by curing (polymerizing) with UV rays. The curing reaction is largely divided into a radical polymerization type and a cationic polymerization type depending on reaction mechanism.

Examples of resin components of the radical polymerization type include urethane acrylate, acrylic resin acrylate (for example, ARONIX series produced by TOAGOSEI Co., Ltd.), epoxy acrylate, polyester acrylate, and silicone-modified acrylate. These can be used alone or in combination of two or more. Examples of the photopolymerization initiators of the radical polymerization type that are used as a mixture with the resin component of the radical polymerization type include benzophenone, Michiler's ketone, o-benzoylmethyl benzoate, acetophenone, 2,4-diethyl thioxanthone, 2-chlorothioxanthone, ethyl anthraquinone, 1-hydroxycyclohexyl phenyl ketone (for example, IRGACURE 184 produced by BASF Japan), 2-hydroxy-2-methyl-1-phenyl-propan-1-one (for example, DAROCUR 1173 produced by BASF Japan), 2,2-dimethoxy-1,2-diphenylethan-1-one (for example, IRGACURE 651 produced by BASF Japan), 2-methyl-1-(4-methylthiophenyl)-2-morpholinopropan-1-one (for example, IRGACURE 907 produced by BASF Japan), 2-benzyl-2-dimethylamino-1(4-morpholinophenyl)-butanone-1 (for example, IRGACURE 369 produced by BASF Japan), 2,4,6-trimethylbenzoyl-diphenyl-phosphine oxide (for example, Lucirin TPC produced by BASF Japan), bis(2,4,6-trimethylbenzoyl)-phenyl phosphine oxide (for example, IRGACURE 819 produced by BASF Japan), and methyl benzoylformate.

Examples of the resin components of cationic polymerization type include styrene derivatives, vinyl ether, oxirane, oxetane, tetrahydrofuran, lactam, and lactone compounds. These can be used alone or in combination of two or more. Examples of the photopolymerization initiators of the cationic polymerization type that are used as a mixture with the resin component of the cationic polymerization type include chemically amplified photoresists and cationic polymerization initiators that are used for photo-cationic polymerizations (see "Imaging Organic Materials", edited by The Japanese Research Association for Organic Electronic Materials, published from Bunshin Publishing Company (1993), pages 187 to 192). Examples of suitable cationic polymerization initiators include $B(C_6F_5)_4^-$, $PF_6^-$, $SbF_6^-$, $CF_3SO_3^-$ salts of aromatic onium compounds such as diazonium, ammonium, iodonium, sulfonium, or phosphonium, sulfonated products that generate sulfonic acid, halides that photogenerate hydrogen halide, and Fe allene complex.

Note that as the polymer-type acrylate, any of the commercially available products and synthesized products may be used. When the synthesized product is used, one constituted of a photo-polymerizable monomer or a photo-polymerizable oligomer may be used. Known synthesis examples described in JP 2010-260905 A may be referenced.

Any of the above-described curing type resin components, lacquer type resin components, and UV-curing type resin components may be used alone or in combination of two or more.

A solvent can be appropriately selected in consideration of a coating method, a film-formation condition and the solubility to the support. Examples of the solvent include: alcohols such as methanol, ethanol, 2-propanol, and 1-butanol; esters such as ethyl acetate, butyl acetate, isobutyl acetate, ethyl propionate, ethylene glycol monomethyl ether acetate, propylene glycol monomethyl ether acetate, and propylene glycol monoethyl ether acetate; ethers such as diethyl ether, propylene glycol monomethyl ether, ethylene glycol monomethyl ether, ethylene glycol monoethyl ether, dioxane, and tetrahydrofuran (THE); glycol derivatives such as ethylene glycol, diethylene glycol, propylene glycol, dipropylene glycol, 1,3-butylene glycol, pentamethylene glycol, and 1,3-octylene glycol; amides such as formamide, N-methyl formamide, dimethyl formamide (DMF), dimethyl acetamide, dimethyl sulfoxide (DMSO), and N-methyl pyrrolidone (NMP); ketones such as acetone, methyl ethyl ketone (MEK), methyl propyl ketone, methyl isobutyl ketone, acetyl acetone and cyclohexanone; benzene derivatives such as toluene, xylene, mesitylene and dodecyl benzene; halogen-based solvents such as chloroform and dichloromethylene; and so on.

The infrared-reflective coating composition according to the present embodiment preferably has a solid content of coating (NV) of 1 to 90% by mass when it is coated. When the solid content of coating falls within the above range, the infrared-reflective pigment can be highly oriented as a coating film shrinks during the step of drying after coating, i.e., can be oriented parallel to a surface to be coated. This enables high infrared-light reflectivity and high visible-light transmissivity. The solid content of coating is more preferably 4 to 40% by mass.

Note that the infrared-reflective coating composition according to the present embodiment may contain, as components other than the above, an anti-sagging agent, a viscosity modifier, an antisettling agent, a cross-linking promoter, a leveling agent, a surface conditioner, a defoaming agent, a plasticizing agent, an antiseptic agent, an antifungal agent, an ultraviolet stabilizer, and the like. Furthermore, the infrared-reflective coating composition according to the present embodiment may contain, as needs arise, a slight amount of a coloring pigment, a brilliant pigment or a dye within a range that does not adversely affect the transparency. Specifically, the coloring pigment may be contained in a range of 20% by mass or less, and the brilliant pigment may be contained in a range of 5% by mass or less in the infrared-reflective coating composition. As the coloring pigment or brilliant pigment, any of the same pigments as those used in the base coating composition can be used.

The infrared reflectance R2 of the infrared-reflective coating film formed from the infrared-reflective coating composition provided with the configuration described above is larger than the infrared reflectance R1 of the base coating film. By setting the infrared reflectance R2 larger than R1, a multi-layer coating film having higher infrared reflectance than that of the case of a mono-layered base coating film may be obtained. If the infrared reflectance R2 is smaller than R1, part of the infrared light that has transmitted through the infrared-reflective coating film and was reflected on a surface of the base coating film is further partially reflected on the base coating film side by the infrared-reflective pigment contained in the infrared-reflective coating film. Due to such reflection of the infrared light in the infrared-reflective coating film, it is considered that resultantly, the infrared reflectance as an entire multi-layer coating film becomes smaller than the infrared reflectance in the mono-layered base coating film.

It is preferable that the clear coating film is formed on the infrared-reflective coating film in the multi-layer coating film according to the present embodiment. The clear coating film is a transparent coating film that does not hide a primer layer and transmits visible light and infrared light, and when irregularity on a surface of the coating film is smoothened, luster is imparted to the multi-layer coating film, thus improving appearance. A clear coating composition that forms the clear coating film is not particularly limited, and can have any form such as a solvent type, an aqueous type, a powder type, or the like. As the solvent type coating composition or aqueous type coating composition, the composition may be one-liquid type or a two-liquid type such as a two-liquid type urethane resin coating composition. A clear coating composition used regularly as a top coating composition can be used as such a clear coating composition. For example, the product of mixing a curable film formation resin used in the base coating compositions mentioned above with a cross-linking agent can be used as a vehicle. Furthermore, the clear coating composition, as needs arise, may contain additives such as a coloring pigment, a body pigment, a modifier, a UV-absorber, a leveling agent, a dispersant, or a defoaming agent, within a range that does not adversely affect the transparency.

Next, a method of forming a multi-layer coating film according to the present embodiment will be described. The method of forming a multi-layer coating film according to the present embodiment includes a step of coating the base coating composition, a step of coating the infrared-reflective coating composition, a step of coating the clear coating composition, and a step of drying.

The step of coating the base coating composition is a step of coating the base coating composition on the matter to be coated. A coating method is not particularly limited in the step of coating a base coating composition according to the present embodiment but an electrostatic coating method is preferably used. The film thickness of the base coating film is preferably 10 to 100 µm.

Furthermore, in the step of coating the base coating composition, the infrared reflectance R1 of the formed base coating film is adjusted to be lower than 80%. Specifically, R1 is adjusted to be lower than 80% by adjusting the type and blending amount of the coloring pigment used in the base coating composition.

The step of coating the infrared-reflective coating composition is a step of coating the infrared coating composition on the matter to be coated having undergone the step of coating the base coating composition. In the step of coating the infrared-reflective coating composition according to the present embodiment, a coating method is not limited. For example, other than the applicator and the bar coater, a brush, a spray or a roller may be used to coat. When the infrared-reflective coating composition according to the present embodiment is coated, as was described above, it is preferable to adjust the solid content of coating during the coating such that the infrared-reflective pigment of the present invention is arranged with high orientation due to shrinkage of the infrared-reflective coating film.

The film thickness of the infrared-reflective coating film is preferably 0.5 to 100 µm, and more preferably 1 to 50 µm as a dry film. When the film thickness is thinner than 0.5 µm, the roughness from the pigment appears on a coating film surface, and design properties are degraded. When the film thickness exceeds 100 µm, defects in the resulting coating film such as sagging and foaming tend to occur.

Furthermore, in the step of coating the infrared-reflective coating composition, the infrared reflectance R2 of the formed infrared-reflective coating film is adjusted to be larger than R1. Specifically, R2 is measured in advance, and the type and an amount of the coloring pigment used in the base coating composition are adjusted such that the infrared reflectance R1 is smaller than R2 and is smaller than 80%, thus R2 is adjusted to be larger than R1.

The method of forming the multi-layer coating film according to the present embodiment is preferably further provided with a step of coating the clear coating composition. The step of coating the clear coating material is a step of coating the clear coating material on the matter to be coated having undergone the step of coating the infrared-reflective coating composition. In the step of coating the clear coating composition according to the present embodiment, a coating method is not particularly limited. For example, other than the applicator and the bar coater, a brush, a spray or a roller may be used to coat. The film thickness of the clear coating film is preferably 10 to 50 µm as a dry film.

In the step of drying, a coating film coated by the coating method above is dried with a baking method or the like to cure. The step of drying after coating an infrared-reflective coating composition is preferably performed at 60 to 200° C. and more preferably performed at 80 to 160° C. In the present embodiment, the step of drying may be performed simultaneously after sequentially coating the base coating composition, the infrared-reflective coating composition, and the clear coating composition wet on wet, or may be performed by repeating actions of separately drying each coating film after coating and thereafter coating an upper layer.

The multi-layer coating film obtained in the above has not only excellent infrared-light reflectivity but also the infrared-reflective coating film has high visible-light transmissivity, thus excellent appearance is provided without bringing adverse effects to aesthetic appearance and design properties.

An evaluation standard of the visible-light transmittance of the infrared-reflective coating film is 40% or higher. When the visible-light transmittance of the infrared-reflective coating film is less than 40%, the transparency of the infrared-reflective coating film is insufficient. Therefore, preferable appearance in the multi-layer coating film may not be obtained.

Furthermore, regarding the infrared reflectance of the multi-layer coating film, infrared reflectance of 40% or higher, that is, higher than that of a black coating film formed according to a conventional subtractive color mixing method, is set as an evaluation standard.

Note that the present invention is not limited to the above embodiments and may include modifications, improvements and so on within a scope that the object of the present invention can be achieved.

EXAMPLES

In what follows, the present invention will be described in more detail with reference to Examples. However, the present invention is not limited by these Examples.
[Infrared-Reflective Pigments 1 to 24]

Infrared-reflective pigments 1 to 24 provided with configurations shown in Tables 1 and 2 were prepared according to the first production method. Specifically, the following procedure was conducted for preparation. First, a solution was prepared by dissolving an acrylic resin ("Acrydic A-1371", manufactured by DIC Corporation) in butyl acetate so as to be 10% by mass (in terms of solid content), and coated on a 50×50×2 mm glass plate (manufactured by TP Giken Co., Ltd.) as a support 10 with a spin coater such that the dry film thickness was 1 µm. After that, the result was dried for 15 minutes at 50° C. to form a release layer.

Then, on the release layer, dielectric layer or metal thin film layer shown in Tables 1 and 2 were formed in an alternate fashion from the first layer up to a maximum of five layers with the dielectric layer on the outermost layer, thus forming a layered body 13. Note that infrared-reflective pigment 15 was provided with only one layer of the metal thin film layer. The dielectric layer and metal thin film layer were formed according to an electron beam method using a vacuum vapor deposition device (model number: EX-200) manufactured by ULVAC, Inc.
(Film Thickness of Dielectric Layer)

Among infrared-reflective pigments 1 to 24, in infrared-reflective pigments 1 to 17 and 20 to 23, a wavelength λ of incident light in and around the visible light region was set to 350 nm; in infrared-reflective pigment 18, similarly, a wavelength λ was set to 600 nm; and in infrared-reflective pigment 19, similarly, a wavelength λ was set to 900 nm, and the dielectric layers were formed to have the film thicknesses shown in Tables 1 and 2. Note that infrared-reflective pigment 24 was provided with only one layer of the metal thin film layer and was not provided with a dielectric layer. Note that regarding the material species used in the dielectric layers and metal thin film layers in Tables 1 and 2, ITO indicates tin-doped indium oxide, ZnO indicates zinc oxide, SnO indicates tin oxide, $TiO_2$ indicates titanium dioxide, $Nb_2O_5$ indicates niobium pentoxide, $CeO_2$ indicates cerium oxide, $Cr_2O_3$ indicates chromium oxide, ZnS indicates zinc sulfide, and Ag indicates a silver compound. Furthermore, the film thickness was controlled with a crystal oscillator type film thickness controller ("CRTM-6000G" manufactured by ULVAC Inc.).

Then, the layered body 13 was soaked for 30 minutes in acetone to dissolve and detach the release layer, and subjected to ultrasonic pulverization. Thereafter, after a nylon mesh having an opening of 50 μm was used to filtrate, washing with acetone and filtration with the nylon mesh were performed, thus obtaining an infrared-reflective pigment.

The base coating compositions were prepared to have the base coating colors and infrared reflectances (R1) shown in Tables 3 to 5. Specifically, predetermined amounts of each paint color of "AR-2000" (melamine-curable acrylic resin water-based top coating composition, manufactured by Nippon Paint Automotive Coatings Co., Ltd. was added as shown below, followed by uniform dispersal, thus obtaining the base coating compositions used in Examples 1 to 31 and Comparative Examples 1 to 13. Black: AQUALEX AR-2000 Black Color Base (product name)

TABLE 1

| | | Infrared-reflective pigment | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Design wavelength λ (nm) | | 350 | 350 | 350 | 350 | 350 | 350 | 350 | 350 | 350 | 350 | 350 | 350 |
| Refractive index of dielectric layer | | 1.95 | 1.95 | 1.95 | 1.95 | 1.95 | 1.95 | 2.4 | 2.4 | 2.4 | 2.4 | 2.3 | 2.3 |
| Total number of layers | | 5 | 5 | 5 | 3 | 3 | 3 | 3 | 3 | 5 | 3 | 3 | 5 |
| First layer (Dielectric layer) | Material type | ITO | ITO | ITO | ITO | ITO | ITO | $TiO_2$ | $TiO_2$ | $TiO_2$ | $Nb_2O_5$ | $Nb_2O_5$ | $Nb_2O_5$ |
| | Film thickness (nm) | 45 | 45 | 45 | 45 | 45 | 45 | 36 | 36 | 36 | 38 | 39 | 40 |
| Second layer (Metal thin film layer) | Material type | Ag | Ag | Ag | Ag | Ag | Ag | Ag | Ag | Ag | Ag | Ag | Ag |
| | Film thickness (nm) | 10 | 13 | 6 | 10 | 13 | 6 | 13 | 6 | 10 | 12 | 6 | 10 |
| Third layer (Dielectric layer) | Material type | ITO | ITO | ITO | ITO | ITO | ITO | $TiO_2$ | $TiO_2$ | $TiO_2$ | $Nb_2O_5$ | $Nb_2O_5$ | $Nb_2O_5$ |
| | Film thickness (nm) | 90 | 90 | 90 | 45 | 45 | 45 | 36 | 36 | 73 | 36 | 39 | 79 |
| Fourth layer (Metal thin film layer) | Material type | Ag | Ag | Ag | — | — | — | — | — | Ag | — | — | Ag |
| | Film thickness (nm) | 10 | 13 | 6 | — | — | — | — | — | 10 | — | — | 10 |
| Fifth layer (Dielectric layer) | Material type | ITO | ITO | ITO | — | — | — | — | — | $TiO_2$ | — | — | $Nb_2O_5$ |
| | Film thickness (nm) | 45 | 45 | 45 | — | — | — | — | — | 36 | — | — | 40 |

TABLE 2

| | | Infrared-reflective pigment | | | | | | | | | | | |
|---|---|---|---|---|---|---|---|---|---|---|---|---|
| | | 13 | 14 | 15 | 16 | 17 | 18 | 19 | 20 | 21 | 22 | 23 | 24 |
| Design wavelength λ (nm) | | 350 | 350 | 350 | 350 | 350 | 600 | 900 | 350 | 350 | 350 | 350 | — |
| Refractive index of dielectric layer | | 2.2 | 2.4 | 2.2 | 2 | 2 | 1.95 | 1.95 | 1.95 | 1.95 | 2.2 | 2.2 | — |
| Total number of layers | | 3 | 3 | 5 | 5 | 5 | 3 | 3 | 5 | 5 | 5 | 5 | 1 |
| First layer (Dielectric layer) | Material type | $CeO_2$ | $CeO_2$ | $CeO_2$ | ZnO | SnO | ITO | ITO | ITO | ITO | $Cr_2O_3$ | ZnS | — |
| | Film thickness (nm) | 40 | 40 | 40 | 44 | 46 | 78 | 125 | 45 | 45 | 32 | 34 | — |
| Second layer (Metal thin film layer) | Material type | Ag | Ag | Ag | Ag | Ag | Ag | Ag | Ag | Ag | Ag | Ag | Ag |
| | Film thickness (nm) | 11 | 6 | 10 | 10 | 10 | 10 | 10 | 4 | 17 | 10 | 10 | 30 |
| Third layer (Dielectric layer) | Material type | $CeO_2$ | $CeO_2$ | $CeO_2$ | ZnO | SnO | ITO | ITO | ITO | ITO | $Cr_2O_3$ | ZnS | — |
| | Film thickness (nm) | 40 | 40 | 80 | 89 | 91 | 78 | 125 | 90 | 90 | 65 | 63 | — |
| Fourth layer (Metal thin film layer) | Material type | — | — | Ag | Ag | Ag | — | — | Ag | Ag | Ag | Ag | — |
| | Film thickness (nm) | — | — | 10 | 10 | 10 | — | — | 4 | 17 | 10 | 10 | — |
| Fifth layer (Dielectric layer) | Material type | — | — | $CeO_2$ | ZnO | SnO | — | — | ITO | ITO | $Cr_2O_3$ | ZnS | — |
| | Film thickness (nm) | — | — | 40 | 44 | 46 | — | — | 45 | 45 | 32 | 34 | — |

Examples 1 to 31, Comparative Examples 1 to 13

Using the base coating compositions and infrared-reflective coating compositions shown in Tables 3 to 5, multi-layer coating films of Examples 1 to 31 and Comparative Examples 1 to 13 were formed. Note that except for Example 28 and Comparative Example 3, multi-layer coating films further provided with a clear coating film were formed.

White: AQUALEX AR-2000 White Color Base (product name)
Silver: AQUALEX AR-2000 Silver Metallic (product name)
(All of the above were manufactured by Nippon Paint Automotive coatings Co., Ltd.)
Grey: obtained by blending the white color base/black color base at 100/10 (mass ratio)
Pale color: obtained by blending the white color base/black color base at 100/3 (mass ratio)

Next, in Examples 1 to 30 and Comparative Examples 1 to 13, after the infrared-reflective pigments 1 to 24 prepared with configurations shown in Tables 1 and 2 or other pigments, brilliant materials and ethyl acetate were mixed and stirred, "Mac flow O-1820" (acid-epoxy curing type clear coating composition, manufactured by Nippon Paint Automotive Coatings Co., Ltd.) was added such that the PWC (pigment weight concentration) of the infrared-reflective pigment was as shown in Tables 3 to 5, and stirred, thus obtaining the respective infrared-reflective coating compositions. In Example 31, after 90.2 parts by mass of ARONIX M-305 (pentaerythritol tri- and tetra-acrylate; produced by TOAGOSEI Co., Ltd.), 0.1 part by mass of Tego Rad 2200N (polydimethyl siloxane modified with a polyether group having an acryloyl group in a side chain; manufactured by TEGO CHEMIE GmbH) and 5.5 parts by mass of hydroxycyclohexyl phenyl ketone serving as a photopolymerization initiator were mixed with butyl acetate, the infrared-reflective pigment was added such that the PWC (pigment weight concentration) was as shown in Table 4, and stirred, thus obtaining the infrared-reflective coating composition. Furthermore, as the clear coating composition, "Mac flow O-1820" (acid-epoxy curing type clear coating composition, manufactured by Nippon Paint Automotive Coatings Co., Ltd.) was used.

As matter to be coated on which the base coating composition and the infrared-reflective coating composition are coated, a substrate was formed on which the primer coating composition and intermediate coating composition were coated. Specifically, the following procedure was taken for preparation. First, a dull steel sheet of 150×300×0.8 mm treated with zinc phosphate was set as a material to be coated, whereupon Power Knicks 310 (product name, isocyanate curing type epoxy resin-based electrodeposition coating composition, manufactured by Nippon Paint Automotive Coatings Co., Ltd.) was electrodeposited such that the dry film thickness was 20 μm, followed by baking at 160° C. for 30 minutes. Next, OrgaP-30 (product name, melamine-curing type polyester resin intermediate coating composition, manufactured by Nippon Paint Automotive Coatings Co., Ltd.) Was spray-coated such that the dry film thickness was 5 μm, and was baked at 140° C. for 30 minutes, followed by cooling, thus obtaining an intermediate Coating substrate.

On the intermediate coating substrate obtained as shown above, each of the base coating compositions and each of the infrared-reflective coating compositions were coated. First, each of the base coating compositions was coated by air spray. Furthermore, regarding Examples 1 to 30 and Comparative Examples 1 to 13, each of the infrared-reflective coating compositions was coated by air spray. Furthermore, a clear coating composition was coated by air spray (except for Example 28 and Comparative Example 3). A coating amount of each of the coating compositions was adjusted to obtain film thicknesses after drying as shown in Tables 3 to 5. After coating each of the coating compositions, followed by standing the resultant product still for 10 minutes at room temperature, the resultant product was then dried at 110° C. for 15 minutes. In Example 31, the infrared-reflective coating composition was coated with a bar coater, followed by inserting into a hot air dryer at 80° C. for 1 minute to remove the solvent. Next, UV-rays were irradiated at 500 mJ/cm². Furthermore, the clear coating composition was coated by air spray. A coating amount of each of the coating compositions was adjusted to obtain film thicknesses after drying as shown in Table 4. In this way, each of the multi-layer coating films was obtained.

[Infrared Reflectance]

As evaluation of the infrared-light reflectivity, infrared-reflective coating films of each of Examples and Comparative Examples were subjected to measurement of the infrared reflectance R1 of the base coating film, the infrared reflectance R2 of the infrared-reflective coating film, and the infrared reflectance of the entire multi-layer coating film. Multi-layer coating films with R2 larger than R1 were determined as acceptable, and ones other than these were determined as unacceptable. Furthermore, multi-layer coating films having infrared reflectance of 40% or higher in the entire multi-layer coating film were determined as acceptable, and ones other than these were determined as unacceptable. Results are shown in Tables 3 to 5.

[Visible-Light Transmittance]

The visible-light transmittance of each of the multi-layer coating films of Examples and Comparative Examples was measured. Multi-layer coating films having visible-light transmittance of 40% or higher were determined as acceptable, and ones other than these were determined as unacceptable. Results are shown in Tables 3 to 5. The infrared reflectance and visible-light transmittance were measured by a method in accordance with JIS-K5602: 2008 "Determination of reflectance of solar radiation by paint film". The spectrophotometer used in the measurement was a spectrophotometer (model number: UV3600) manufactured by Shimadzu Corporation.

TABLE 3

| | | Example | | | | | | | |
|---|---|---|---|---|---|---|---|---|---|
| | | 1 | 2 | 3 | 4 | 5 | 6 | 7 | 8 |
| Base coating composition | Base coating color | Black | Black | Black | Black | Black | Black | Black | Black |
| Infrared-reflective coating composition (PWC %) | Infrared-reflective pigment 1 | 14.3 | — | — | — | — | — | — | — |
| | Infrared-reflective pigment 2 | — | 14.3 | — | — | — | — | — | — |
| | Infrared-reflective pigment 3 | — | — | 14.3 | — | — | — | — | — |
| | Infrared-reflective pigment 4 | — | — | — | 14.3 | — | — | — | — |
| | Infrared-reflective pigment 5 | — | — | — | — | 14.3 | — | — | — |
| | Infrared-reflective pigment 6 | — | — | — | — | — | 14.3 | — | — |
| | Infrared-reflective pigment 7 | — | — | — | — | — | — | 14.3 | — |
| | Infrared-reflective pigment 8 | — | — | — | — | — | — | — | 14.3 |
| | Infrared-reflective pigment 9 | — | — | — | — | — | — | — | — |
| | Infrared-reflective pigment 10 | — | — | — | — | — | — | — | — |
| | Infrared-reflective pigment 11 | — | — | — | — | — | — | — | — |
| | Infrared-reflective pigment 12 | — | — | — | — | — | — | — | — |
| | Infrared-reflective pigment 13 | — | — | — | — | — | — | — | — |
| | Infrared-reflective pigment 14 | — | — | — | — | — | — | — | — |

TABLE 3-continued

|  |  |  |  |  |  |  |  |  |
|---|---|---|---|---|---|---|---|---|
|  | Infrared-reflective pigment 15 | — | — | — | — | — | — | — | — |
|  | Infrared-reflective pigment 16 | — | — | — | — | — | — | — | — |
|  | Infrared-reflective pigment 17 | — | — | — | — | — | — | — | — |
|  | Infrared-reflective pigment 18 | — | — | — | — | — | — | — | — |
|  | Infrared-reflective pigment 19 | — | — | — | — | — | — | — | — |
|  | Infrared-reflective pigment 20 | — | — | — | — | — | — | — | — |
|  | Infrared-reflective pigment 21 | — | — | — | — | — | — | — | — |
|  | Infrared-reflective pigment 22 | — | — | — | — | — | — | — | — |
|  | Infrared-reflective pigment 23 | — | — | — | — | — | — | — | — |
|  | Infrared-reflective pigment 24 | — | — | — | — | — | — | — | — |
|  | Red pigment | — | — | — | — | — | — | — | — |
|  | Yellow pigment | — | — | — | — | — | — | — | — |
|  | Blue pigment | — | — | — | — | — | — | — | — |
|  | Green pigment | — | — | — | — | — | — | — | — |
|  | Brilliant material | — | — | — | — | — | — | — | — |
| Base coating film | Infrared reflectance (R1) (%) | 3.2 | 3.2 | 3.2 | 3.2 | 3.2 | 3.2 | 3.2 | 3.2 |
| Infrared-reflective coating film | Infrared reflectance (R2) (%) | 82 | 86 | 70 | 54 | 57 | 51 | 56 | 52 |
|  | Visible-light transmittance (%) | 73 | 70 | 78 | 85 | 79 | 86 | 85 | 87 |
|  | Film thickness (μm) | 5 | 5 | 5 | 5 | 5 | 5 | 5 | 5 |
| Clear coating film | Film thickness (μm) | 35 | 35 | 35 | 35 | 35 | 35 | 35 | 35 |
| Multi-layer coating film | Infrared reflectance (%) | 75 | 82 | 67 | 50 | 54 | 48 | 52 | 49 |

|  |  | Example | | | | | | | |
|---|---|---|---|---|---|---|---|---|---|
|  |  | 9 | 10 | 11 | 12 | 13 | 14 | 15 | 16 |
| Base coating composition | Base coating color | Black | Black | Black | Black | Black | Black | Black | Black |
| Infrared-reflective coating composition (PWC %) | Infrared-reflective pigment 1 | — | — | — | — | — | — | — | — |
|  | Infrared-reflective pigment 2 | — | — | — | — | — | — | — | — |
|  | Infrared-reflective pigment 3 | — | — | — | — | — | — | — | — |
|  | Infrared-reflective pigment 4 | — | — | — | — | — | — | — | — |
|  | Infrared-reflective pigment 5 | — | — | — | — | — | — | — | — |
|  | Infrared-reflective pigment 6 | — | — | — | — | — | — | — | — |
|  | Infrared-reflective pigment 7 | — | — | — | — | — | — | — | — |
|  | Infrared-reflective pigment 8 | — | — | — | — | — | — | — | — |
|  | Infrared-reflective pigment 9 | 14.3 | — | — | — | — | — | — | — |
|  | Infrared-reflective pigment 10 | — | 14.3 | — | — | — | — | — | — |
|  | Infrared-reflective pigment 11 | — | — | 14.3 | — | — | — | — | — |
|  | Infrared-reflective pigment 12 | — | — | — | 14.3 | — | — | — | — |
|  | Infrared-reflective pigment 13 | — | — | — | — | 14.3 | — | — | — |
|  | Infrared-reflective pigment 14 | — | — | — | — | — | 14.3 | — | — |
|  | Infrared-reflective pigment 15 | — | — | — | — | — | — | 14.3 | — |
|  | Infrared-reflective pigment 16 | — | — | — | — | — | — | — | 14.3 |
|  | Infrared-reflective pigment 17 | — | — | — | — | — | — | — | — |
|  | Infrared-reflective pigment 18 | — | — | — | — | — | — | — | — |
|  | Infrared-reflective pigment 19 | — | — | — | — | — | — | — | — |
|  | Infrared-reflective pigment 20 | — | — | — | — | — | — | — | — |
|  | Infrared-reflective pigment 21 | — | — | — | — | — | — | — | — |
|  | Infrared-reflective pigment 22 | — | — | — | — | — | — | — | — |
|  | Infrared-reflective pigment 23 | — | — | — | — | — | — | — | — |
|  | Infrared-reflective pigment 24 | — | — | — | — | — | — | — | — |
|  | Red pigment | — | — | — | — | — | — | — | — |
|  | Yellow pigment | — | — | — | — | — | — | — | — |
|  | Blue pigment | — | — | — | — | — | — | — | — |
|  | Green pigment | — | — | — | — | — | — | — | — |
|  | Brilliant material | — | — | — | — | — | — | — | — |
| Base coating film | Infrared reflectance (R1) (%) | 3.2 | 3.2 | 3.2 | 3.2 | 3.2 | 3.2 | 3.2 | 3.2 |
| Infrared-reflective coating film | Infrared reflectance (R2) (%) | 83 | 55 | 51 | 81 | 55 | 50 | 84 | 46 |
|  | Visible-light transmittance (%) | 75 | 85 | 86 | 73 | 85 | 87 | 71 | 65 |
|  | Film thickness (μm) | 5 | 5 | 5 | 5 | 5 | 5 | 5 | 5 |
| Clear coating film | Film thickness (μm) | 35 | 35 | 35 | 35 | 35 | 35 | 35 | 35 |
| Multi-layer coating film | Infrared reflectance (%) | 76 | 54 | 48 | 74 | 53 | 49 | 73 | 42 |

TABLE 4

| | | Example | | | | | | | |
|---|---|---|---|---|---|---|---|---|---|
| | | 17 | 18 | 19 | 20 | 21 | 22 | 23 | 24 |
| Base coating composition | Base coating color | Black | Black | Black | Black | Black | Black | Black | Black |
| Infrared-reflective coating composition (PWC %) | Infrared-reflective pigment 1 | — | — | — | 10 | 7.2 | 14.3 | 12 | 12 |
| | Infrared-reflective pigment 2 | — | — | — | — | — | — | — | — |
| | Infrared-reflective pigment 3 | — | — | — | — | — | — | — | — |
| | Infrared-reflective pigment 4 | — | — | — | — | 7.2 | — | — | — |
| | Infrared-reflective pigment 5 | — | — | — | — | — | — | — | — |
| | Infrared-reflective pigment 6 | — | — | — | — | — | — | — | — |
| | Infrared-reflective pigment 7 | — | — | — | — | — | — | — | — |
| | Infrared-reflective pigment 8 | — | — | — | — | — | — | — | — |
| | Infrared-reflective pigment 9 | — | — | — | — | — | — | — | — |
| | Infrared-reflective pigment 10 | — | — | — | — | — | — | — | — |
| | Infrared-reflective pigment 11 | — | — | — | — | — | — | — | — |
| | Infrared-reflective pigment 12 | — | — | — | — | — | — | — | — |
| | Infrared-reflective pigment 13 | — | — | — | — | — | — | — | — |
| | Infrared-reflective pigment 14 | — | — | — | — | — | — | — | — |
| | Infrared-reflective pigment 15 | — | — | — | — | — | — | — | — |
| | Infrared-reflective pigment 16 | — | — | — | — | — | — | — | — |
| | Infrared-reflective pigment 17 | 14.3 | — | — | — | — | — | — | — |
| | Infrared-reflective pigment 18 | — | 14.3 | — | — | — | — | — | — |
| | Infrared-reflective pigment 19 | — | — | 14.3 | — | — | — | — | — |
| | Infrared-reflective pigment 20 | — | — | — | — | — | — | — | — |
| | Infrared-reflective pigment 21 | — | — | — | — | — | — | — | — |
| | Infrared-reflective pigment 22 | — | — | — | — | — | — | — | — |
| | Infrared-reflective pigment 23 | — | — | — | — | — | — | — | — |
| | Infrared-reflective pigment 24 | — | — | — | — | — | — | — | — |
| | Red pigment | — | — | — | — | — | — | 2.7 | — |
| | Yellow pigment | — | — | — | — | — | — | — | 2.7 |
| | Blue pigment | — | — | — | — | — | — | — | — |
| | Green pigment | — | — | — | — | — | — | — | — |
| | Brilliant material | — | — | — | — | — | — | — | — |
| Base coating film | Infrared reflectance (R1) (%) | 3.2 | 3.2 | 3.2 | 3.2 | 3.2 | 3.2 | 3.2 | 3.2 |
| Infrared-reflective coating film | Infrared reflectance (R2) (%) | 48 | 48 | 48 | 58 | 69 | 65 | 69 | 69 |
| | Visible-light transmittance (%) | 51 | 51 | 51 | 78 | 74 | 76 | 60 | 62 |
| | Film thickness (μm) | 5 | 5 | 5 | 5 | 5 | 3 | 5 | 5 |
| Clear coating film | Film thickness (μm) | 35 | 35 | 35 | 35 | 35 | 35 | 35 | 35 |
| Multi-layer coating film | Infrared reflectance (%) | 44 | 44 | 44 | 55 | 65 | 78 | 65 | 65 |

| | | Example | | | | | | |
|---|---|---|---|---|---|---|---|---|
| | | 25 | 26 | 27 | 28 | 29 | 30 | 31 |
| Base coating composition | Base coating color | Black | Black | Black | Black | Grey | Pale color | Black |
| Infrared-reflective coating composition (PWC %) | Infrared-reflective pigment 1 | 12 | 12 | 12 | 2 | 14.3 | 14.3 | 14.3 |
| | Infrared-reflective pigment 2 | — | — | — | — | — | — | — |
| | Infrared-reflective pigment 3 | — | — | — | — | — | — | — |
| | Infrared-reflective pigment 4 | — | — | — | — | — | — | — |
| | Infrared-reflective pigment 5 | — | — | — | — | — | — | — |
| | Infrared-reflective pigment 6 | — | — | — | — | — | — | — |
| | Infrared-reflective pigment 7 | — | — | — | — | — | — | — |
| | Infrared-reflective pigment 8 | — | — | — | — | — | — | — |
| | Infrared-reflective pigment 9 | — | — | — | — | — | — | — |
| | Infrared-reflective pigment 10 | — | — | — | — | — | — | — |
| | Infrared-reflective pigment 11 | — | — | — | — | — | — | — |
| | Infrared-reflective pigment 12 | — | — | — | — | — | — | — |
| | Infrared-reflective pigment 13 | — | — | — | — | — | — | — |
| | Infrared-reflective pigment 14 | — | — | — | — | — | — | — |
| | Infrared-reflective pigment 15 | — | — | — | — | — | — | — |
| | Infrared-reflective pigment 16 | — | — | — | — | — | — | — |
| | Infrared-reflective pigment 17 | — | — | — | — | — | — | — |
| | Infrared-reflective pigment 18 | — | — | — | — | — | — | — |
| | Infrared-reflective pigment 19 | — | — | — | — | — | — | — |
| | Infrared-reflective pigment 20 | — | — | — | — | — | — | — |
| | Infrared-reflective pigment 21 | — | — | — | — | — | — | — |
| | Infrared-reflective pigment 22 | — | — | — | — | — | — | — |
| | Infrared-reflective pigment 23 | — | — | — | — | — | — | — |
| | Infrared-reflective pigment 24 | — | — | — | — | — | — | — |
| | Red pigment | — | — | — | — | — | — | — |
| | Yellow pigment | — | — | — | — | — | — | — |

TABLE 4-continued

|  |  |  |  |  |  |  |  |  |
|---|---|---|---|---|---|---|---|---|
|  | Blue pigment | 2.7 | — | — | — | — | — | — |
|  | Green pigment | — | 2.7 | — | — | — | — | — |
|  | Brilliant material | — | — | 2.7 | — | — | — | — |
| Base coating film | Infrared reflectance (R1) (%) | 3.2 | 3.2 | 3.2 | 3.2 | 30 | 42 | 3.2 |
| Infrared-reflective coating film | Infrared reflectance (R2) (%) | 69 | 69 | 69 | 81 | 82 | 82 | 82 |
|  | Visible-light transmittance (%) | 55 | 57 | 72 | 70 | 73 | 73 | 73 |
|  | Film thickness (μm) | 5 | 5 | 5 | 40 | 5 | 5 | 5 |
| Clear coating film | Film thickness (μm) | 35 | 35 | 35 | — | 35 | 35 | 35 |
| Multi-layer coating film | Infrared reflectance (%) | 65 | 65 | 65 | 76 | 77 | 79 | 75 |

TABLE 5

|  |  | Comparative Example |  |  |  |  |  |  |
|---|---|---|---|---|---|---|---|---|
|  |  | 1 | 2 | 3 | 4 | 5 | 6 | 7 |
| Base coating composition | Base coating color | White | Silver | Black | Black | Black | Black | Black |
| Infrared-reflective coating composition (PWC %) | Infrared-reflective pigment 1 | — | — | — | — | — | — | — |
|  | Infrared-reflective pigment 2 | — | — | — | — | — | — | — |
|  | Infrared-reflective pigment 3 | — | — | — | — | — | — | — |
|  | Infrared-reflective pigment 4 | — | — | — | — | — | — | — |
|  | Infrared-reflective pigment 5 | — | — | — | — | — | — | — |
|  | Infrared-reflective pigment 6 | 14.3 | 14.3 | — | — | — | — | — |
|  | Infrared-reflective pigment 7 | — | — | — | — | — | — | — |
|  | Infrared-reflective pigment 8 | — | — | — | — | — | — | — |
|  | Infrared-reflective pigment 9 | — | — | — | — | — | — | — |
|  | Infrared-reflective pigment 10 | — | — | — | — | — | — | — |
|  | Infrared-reflective pigment 11 | — | — | — | — | — | — | — |
|  | Infrared-reflective pigment 12 | — | — | — | — | — | — | — |
|  | Infrared-reflective pigment 13 | — | — | — | — | — | — | — |
|  | Infrared-reflective pigment 14 | — | — | — | — | — | — | — |
|  | Infrared-reflective pigment 15 | — | — | — | — | — | — | — |
|  | Infrared-reflective pigment 16 | — | — | — | — | — | — | — |
|  | Infrared-reflective pigment 17 | — | — | — | — | — | — | — |
|  | Infrared-reflective pigment 18 | — | — | — | — | — | — | — |
|  | Infrared-reflective pigment 19 | — | — | — | — | — | — | — |
|  | Infrared-reflective pigment 20 | — | — | — | 14.3 | — | — | — |
|  | Infrared-reflective pigment 21 | — | — | — | — | 14.3 | — | — |
|  | Infrared-reflective pigment 22 | — | — | — | — | — | 14.3 | — |
|  | Infrared-reflective pigment 23 | — | — | — | — | — | — | 14.3 |
|  | Infrared-reflective pigment 24 | — | — | — | — | — | — | — |
|  | Red pigment | — | — | — | — | — | — | — |
|  | Yellow pigment | — | — | — | — | — | — | — |
|  | Blue pigment | — | — | — | — | — | — | — |
|  | Green pigment | — | — | — | — | — | — | — |
|  | Brilliant material | — | — | — | — | — | — | — |
| Base coating film | Infrared reflectance (R1) (%) | 85 | 86 | 3.2 | 3.2 | 3.2 | 3.2 | 3.2 |
| Infrared-reflective coating film | Infrared reflectance (R2) (%) | 51 | 51 | 5 | 38 | 39 | 80 | 80 |
|  | Visible-light transmittance (%) | 86 | 76 | 89 | 53 | 55 | 36 | 38 |
|  | Film thickness (μm) | 5 | 5 | 40 | 5 | 5 | 5 | 5 |
| Clear coating film | Film thickness (μm) | 35 | 35 | — | 35 | 35 | 35 | 35 |
| Multi-layer coating film | Infrared reflectance (%) | 60 | 62 | 4 | 35 | 36 | 75 | 75 |

|  |  | Comparative Example |  |  |  |  |  |
|---|---|---|---|---|---|---|---|
|  |  | 8 | 9 | 10 | 11 | 12 | 13 |
| Base coating composition | Base coating color | Black | Black | Black | Black | Black | Black |
| Infrared-reflective coating composition (PWC %) | Infrared-reflective pigment 1 | — | — | — | — | — | — |
|  | Infrared-reflective pigment 2 | — | — | — | — | — | — |
|  | Infrared-reflective pigment 3 | — | — | — | — | — | — |
|  | Infrared-reflective pigment 4 | — | — | — | — | — | — |
|  | Infrared-reflective pigment 5 | — | — | — | — | — | — |
|  | Infrared-reflective pigment 6 | — | — | — | — | — | — |
|  | Infrared-reflective pigment 7 | — | — | — | — | — | — |

TABLE 5-continued

|  |  |  |  |  |  |  |  |
|---|---|---|---|---|---|---|---|
|  | Infrared-reflective pigment 8 | — | — | — | — | — | — |
|  | Infrared-reflective pigment 9 | — | — | — | — | — | — |
|  | Infrared-reflective pigment 10 | — | — | — | — | — | — |
|  | Infrared-reflective pigment 11 | — | — | — | — | — | — |
|  | Infrared-reflective pigment 12 | — | — | — | — | — | — |
|  | Infrared-reflective pigment 13 | — | — | — | — | — | — |
|  | Infrared-reflective pigment 14 | — | — | — | — | — | — |
|  | Infrared-reflective pigment 15 | — | — | — | — | — | — |
|  | Infrared-reflective pigment 16 | — | — | — | — | — | — |
|  | Infrared-reflective pigment 17 | — | — | — | — | — | — |
|  | Infrared-reflective pigment 18 | — | — | — | — | — | — |
|  | Infrared-reflective pigment 19 | — | — | — | — | — | — |
|  | Infrared-reflective pigment 20 | — | — | — | — | — | — |
|  | Infrared-reflective pigment 21 | — | — | — | — | — | — |
|  | Infrared-reflective pigment 22 | — | — | — | — | — | — |
|  | Infrared-reflective pigment 23 | — | — | — | — | — | — |
|  | Infrared-reflective pigment 24 | 14.3 | — | — | — | — | — |
|  | Red pigment | — | 2.7 | — | — | — | — |
|  | Yellow pigment | — | — | 2.7 | — | — | — |
|  | Blue pigment | — | — | — | 2.7 | — | — |
|  | Green pigment | — | — | — | — | 2.7 | — |
|  | Brilliant material | — | — | — | — | — | 7 |
| Base coating film | Infrared reflectance (R1) (%) | 3.2 | 3.2 | 3.2 | 3.2 | 3.2 | 3.2 |
| Infrared-reflective coating film | Infrared reflectance (R2) (%) | 80 | 5 | 5 | 5 | 5 | 5 |
|  | Visible-light transmittance (%) | 21 | 72 | 70 | 73 | 72 | 65 |
|  | Film thickness (μm) | 5 | 5 | 5 | 5 | 5 | 5 |
| Clear coating film | Film thickness (μm) | 35 | 35 | 35 | 35 | 35 | 35 |
| Multi-layer coating film | Infrared reflectance (%) | 75 | 4 | 4 | 4 | 4 | 4 |

By comparing Examples 1 to 31 with Comparative Examples 1 and 2, it was found that while the multi-layer coating films of Comparative Examples 1 and 2 have lower infrared reflectance than that of the case of the mono-layered base coating film, the multi-layer coating films of Examples 1 to 31 have improved infrared reflectance compared to the case of the mono-layered base coating film. From this, it was confirmed that when the infrared reflectance R1 of the base coating film is set smaller than 80% and the infrared reflectance R2 of the infrared-reflective coating film is made larger than the infrared reflectance R1 of the base coating film, a multi-layer coating film having higher infrared reflectance than that of the case of the mono-layered base coating film can be formed.

By comparing Examples 1 to 31 with Comparative Examples 4 and 5, it was found that the infrared-reflective coating films in the multi-layer coating films of Examples 1 to 31 have higher infrared reflectance and visible-light transmittance than those of the infrared-reflective coating films in the multi-layer coating films of Comparative Examples 4 and 5 and are excellent in the infrared reflectance of the multi-layer coating film. From this, it was confirmed that when the infrared-reflective pigment in which a film thickness of the metal thin film layer is set to 5 to 15 nm is contained in the infrared-reflective coating film, an infrared-reflective coating film provided with both high infrared-light reflectivity and high visible-light transmittance can be formed.

By comparing Examples 1 to 31 with Comparative Examples 6 and 7, it was found that the infrared-reflective coating films in the multi-layer coating films of Examples 1 to 31 have higher visible-light transmittance than that of the infrared-reflective coating films in the multi-layer coating films of Comparative Examples 6 and 7. From this, it was confirmed that when the infrared-reflective pigment in which the dielectric layer is formed from one or more materials selected from the group consisting of titanium dioxide, niobium pentoxide, cerium oxide, tin-doped indium oxide, zinc oxide, and tin oxide is contained in the infrared-reflective coating film, an infrared-reflective coating film having high visible-light transmittance can be formed.

By comparing Examples 1 to 31 with Comparative Example 8, it was found that the infrared-reflective coating films in the multi-layer coating films of Examples 1 to 31 have higher visible-light transmittance than that of the infrared-reflective coating film in the multi-layer coating film of Comparative Example S. From this, it was confirmed that when the infrared-reflective pigment in which the dielectric layers and a metal thin film layer are layered in an alternate fashion with the dielectric layer on the outermost layer and a film thickness of the metal thin film layer set at 5 to 15 nm is contained in the infrared-reflective coating film, an infrared-reflective coating film having high visible-light transmittance can be formed.

By comparing Examples 1 to 31 with Comparative Examples 3 and 9 to 13, it was found that the infrared-reflective coating films in the multi-layer coating films of Examples 1 to 31 have higher infrared reflectance than that of the infrared-reflective coating films in the multi-layer coating films of Comparative Examples 3 and 9 to 13. From this, it was confirmed that when the infrared-reflective pigment according to the present embodiment is contained in the infrared-reflective coating film, an infrared-reflective coating film having high infrared-light reflectivity can be formed.

EXPLANATION OF REFERENCE NUMERALS 1, 1A INFRARED-REFLECTIVE PIGMENT
10, 10A SUPPORT
11 METAL THIN FILM LAYER
12 DIELECTRIC LAYER
13 LAYERED BODY

The invention claimed is:

1. A multi-layer coating film comprising:
a base coating film formed on matter to be coated; and
an infrared-reflective coating film formed on the base coating film,
wherein the infrared-reflective coating film comprises a scale-like infrared-reflective pigment and a resin;
the infrared-reflective pigment comprises a layered body in which a dielectric layer and a metal thin film layer are layered in an alternate fashion with the dielectric layer arranged on an outermost layer;
the dielectric layer consists of one or more materials selected from the group consisting of titanium dioxide, niobium pentoxide, cerium oxide, tin-doped indium oxide, zinc oxide, and tin oxide;
the metal thin film layer consists of a silver compound;
a film thickness of the metal thin film layer is 5 to 15 nm;
a film thickness of the dielectric layer is $((N\lambda)/(4r))\pm 20$ nm, wherein N is 1, 2 or 3;
wherein wavelength $\lambda$ of incident light in and around a visible light region is 250 to 980 nm, and r is a refractive index of the dielectric layer;
an infrared reflectance R1 of the base coating film is smaller than 80%; and
an infrared reflectance R2 of the infrared-reflective coating film is larger than R1.

2. The multi-layer coating film according to claim 1, wherein the layered body has three layers or five layers.

3. The multi-layer coating film according to claim 1, further comprising a clear coating film formed on the infrared-reflective coating film.

4. A method of forming a multi-layer coating film comprising:
a step of coating a base coating material that forms a base coating film by coating the base coating material on matter to be coated; and
a step of coating an infrared-reflective coating material that forms an infrared-reflective coating film by coating an infrared-reflective coating material on the matter to be coated having undergone the step of coating the base coating material,
wherein the infrared-reflective coating material comprises a scale-like infrared-reflective pigment and a resin component;
the infrared-reflective pigment comprises a layered body in which a dielectric layer and a metal thin film layer are layered in an alternate fashion with the dielectric layer arranged on an outermost layer;
the dielectric layer consists of one or more materials selected from the group consisting of titanium dioxide, niobium pentoxide, cerium oxide, tin-doped indium oxide, zinc oxide, and tin oxide;
the metal thin film layer consists of a silver compound;
a film thickness of the metal thin film layer is 5 to 15 nm;
a film thickness of the dielectric layer is $((N\lambda)/(4r))\pm 20$ nm, wherein N is 1, 2 or 3, wherein wavelength $\lambda$ of incident light in and around a visible light region is 250 to 980 nm, and r is a refractive index of the dielectric layer;
in the step of coating the base coating material, infrared reflectance R1 of the base coating film formed is adjusted to be smaller than 80%; and
in the step of coating the infrared-reflective coating material, infrared reflectance R2 of the infrared-reflective coating film formed is adjusted to be larger than R1.

5. The method of forming a multi-layer coating film according to claim 4, wherein the layered body has three layers or five layers.

6. The method of forming a multi-layer coating film according to claim 4, further comprising a step of coating a clear coating material that forms a clear coating film by coating a clear coating material on the matter to be coated having undergone the step of coating the infrared-reflective coating material.

* * * * *